United States Patent [19]

Tyler

[11] 4,207,366
[45] Jun. 10, 1980

[54] STRUCTURED ART SURFACE

[76] Inventor: Kenneth E. Tyler, P.O. Box 294, Bedford Village, N.Y. 10506

[21] Appl. No.: 925,926

[22] Filed: Jul. 19, 1978

Related U.S. Application Data

[63] Continuation-in-part of Ser. No. 867,135, Jan. 5, 1978, abandoned, which is a continuation of Ser. No. 693,374, Jun. 7, 1976, abandoned.

[51] Int. Cl.² .................................................. B32B 3/12
[52] U.S. Cl. ............................... 428/73; 156/292; 428/116
[58] Field of Search .................. 428/73, 116, 131, 118; 156/197, 292

[56] References Cited

U.S. PATENT DOCUMENTS

| | | | |
|---|---|---|---|
| Re. 26,444 | 8/1968 | Paige | 428/116 X |
| 2,581,421 | 1/1952 | Lombard et al. | 428/116 X |
| 2,607,711 | 8/1952 | Hendricks | 428/40 |
| 2,634,361 | 4/1953 | Reynolds | 428/116 X |
| 2,668,327 | 2/1954 | Steele | 428/116 X |
| 2,815,795 | 12/1957 | Vander Poel | 428/116 X |
| 3,016,315 | 1/1962 | Robinson | 428/116 X |
| 3,074,839 | 1/1963 | May et al. | 428/116 X |
| 3,106,503 | 10/1963 | Randall et al. | 428/118 X |
| 3,518,147 | 6/1970 | Harmsen | 156/252 |
| 3,532,586 | 10/1970 | Haurey et al. | 156/252 X |
| 3,632,385 | 1/1972 | Schmitt et al. | 428/408 X |
| 3,671,382 | 6/1972 | Pierce | 428/459 |
| 3,906,127 | 9/1975 | Hollmann et al. | 428/73 |
| 4,065,596 | 12/1977 | Groody | 428/314 X |

*Primary Examiner*—Henry F. Epstein
*Attorney, Agent, or Firm*—Kane, Dalsimer, Kane, Sullivan and Kurucz

[57] ABSTRACT

The disclosure is of a dimensionally stable, rigid, crush resistant, non-warping, structured art surface. In one embodiment, watercolor, drawing or conservation paper is embedded as a face sheet in an adhesive on a sandwich laminate including a honeycomb core. The resulting art surface provides watercoloring, drawing, painting, screen printing or conservation surfaces of unprecedented stability. This permits one to paint, draw on screen print on relatively thin sheets of art paper without limiting the sheet in size. As conversation board the surface with its stable and rigid construction may be used for mounting original art including photographs. The art surface of the invention may also be used in the construction of a maquette.

5 Claims, 4 Drawing Figures

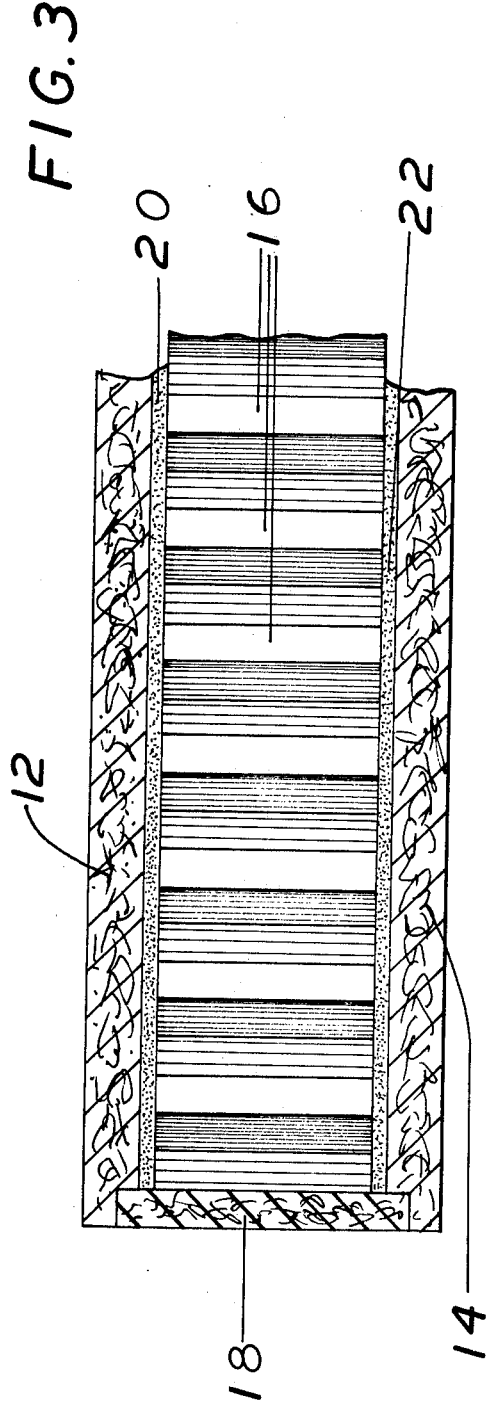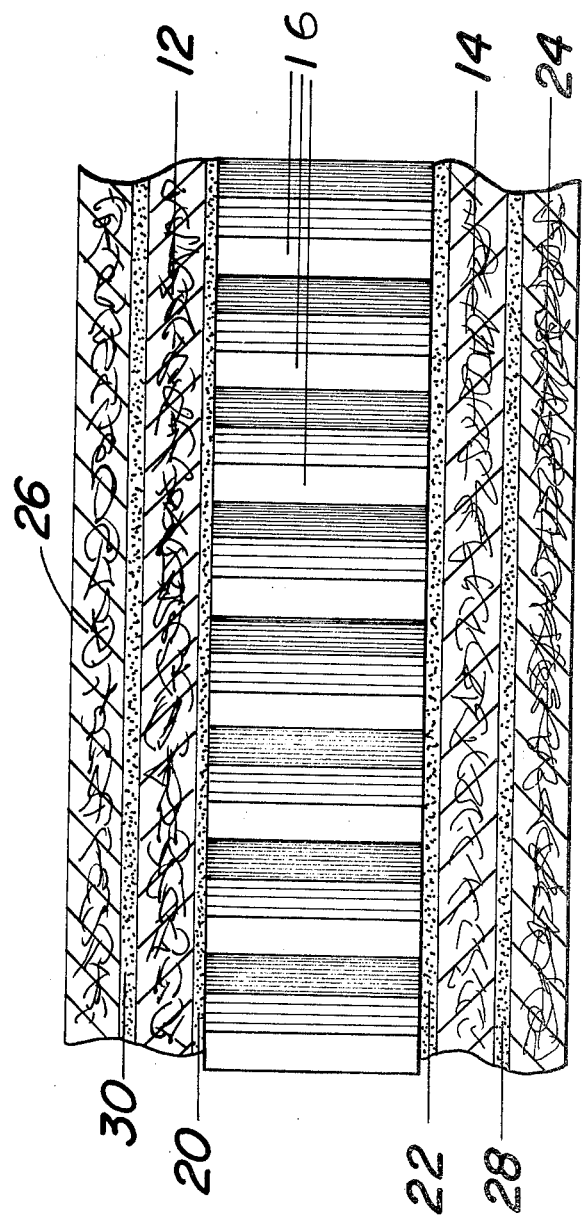

STRUCTURED ART SURFACE

CROSS-REFERENCE TO RELATED APPLICATIONS

This application is a continuation-in-part of my then copending patent application Ser. No. 867,135 filed Jan. 5, 1978, now abandoned, and which in turn was a continuation of my patent application Ser. No. 693,374 filed June 7, 1976, now abandoned.

BACKGROUND OF THE INVENTION

1. Field of the Invention

The invention relates to structured art surfaces and more particularly relates to watercolor, drafting, conservation sculptor and like surfaces and to methods of stabilizing watercolor, drawing and conservation surfaces.

2. Brief Description of the Prior Art

It has been said that the primary principle of aesthetics is order and unity. Following this principle, the watercolorist and draftsman seek unity in their rendition by careful wedding of colors to a drawing or painting surface. Since traditionally, the watercolorist and draftsman apply colors ranging from transparent to opaque, to a paper surface, particular paper surface properties are required for such use. The paper coloring surface is visible and in fact supplies to the painting or drawing an approximation of light, lending all the beauty of light to the painting. The watercolorist and draftsman often seek in their renditions certain qualities and effects which are related to the thickness, surface texture, absorbence, tone and color of the paper they use as a painting or drawing surface.

The term "watercolor paper" is used throughout the specification and claims to mean those papers used by the professional watercolorist for drawing and watercoloring. In the past, such watercolor papers have been either hand made or "mould made" (manufactured on a paper machine of the cylinder type) either in the United States or in foreign countries, principally in France, England and Italy. Recent times have seen the demise of much of handmade paper production, and as a consequence, most watercolor paper in use today is machine made. Traditionally, these papers have been manufactured with a fibre content of all "rag" (cotton fibre), but have not generally been available as neutral (pH 7) papers. Twentieth-century research has demonstrated that neutrality in paper is the most important factor in paper permanence, and further, is more important than fibre composition. It may be stated, therefore, that for maximum permanence it is neutrality in paper, and not simply "100 percent rag content," that is the sine qua non.

Watercolor paper have heretofore been generally available in at least several weights. Current manufacturing offers a range of from 70 lb. (153 gram) paper (referring to the weight per 500 sheets of 22"×30" paper) to the heaviest generally a 600 lb. (1280 gram) paper. Intermediate weights include 90 lb. (185 gram), 140 lb. (300 gram) and 300 lb. (640 gram) paper. The thinner papers, i.e.; 140 lb. and less possess many delightful qualities of surface and delicacies of tone to warrant their use. However, these thin papers quickly expand and buckle when exposed to the water medium used by the watercolorist. To use the thinner papers, the watercolorist must first stretch and secure the papers to a solid support since it is nearly impossible to paint satisfactorily on a wavy surface. The usual method of stretching the watercolor paper comprises dampening the paper with water and stretching and securing the edge of the paper to the stretcher frame or to a board. The paper is then dried and painted on.

The prior art technique required for employing thin watercolor papers has not been entirely satisfactory except for relatively small sheets, i.e.; 18"×24" or smaller. Even with the smaller sheets, but particularly with larger sheets of watercolor paper it is difficult to stretch the dampened paper sufficiently to prevent subsequent buckling when a watercolor is applied. Very often the paper will split during stretching or while being worked on. In any event, the appearance of a cockled surface or a split will destroy the desired unity in the artist's rendition as shown in FIG. 1 of the accompanying drawings, where a watercolor paper 5 has an uneven surface after painting. A further disadvantage is that generally the secured edge of the stretched paper must be trimmed off to finish the painting.

Prior art attempts to solve the problems of dimensional instability in watercolor papers, particularly thin papers, have included pasting the paper on a firm, full support such as hard board and the like. This practice however is severely condemned by art conservators. Writing in the Boston Museum of Fine Arts Publication "How to Care For Works of Art on Paper" (1971; Library of Congress Catalog Card No. 77-157703) Dolloff and Perkinson have stated "Under no condition should a picture be mounted down merely for the sake of removing a few waves or slight buckling."

"Just as common is the gluing of watercolors onto brown Kraft paper and pulling them tight as a drumhead across a wooden stretcher. This method of mounting should be avoided, since the wood resins and cheap paper will cause stains, and because the constant tension on the picture may weaken the fibers of the paper."

Gluing pictures down indiscriminately is harmful, unnecessary, and diminishes the monetary and aesthetic value of a work of art."

Part of the difficulty results from the undesirability of adhering two dissimilar materials together, each of which may expand and contract differently under the same humidity conditions.

By the method of my invention, watercolor papers are stabilized so that even the thinnest, lightest papers may be used by the watercolorist without first stretching them and without waste resulting from trimming of the borders. The watercolor surface of the invention will not kink or become "dog-eared" like the prior art papers, will not buckle or cockle when watercolors are applied and permit the watercolorist to use the lightest, thinnest papers, unrestricted in size. Even surfaces of 8 and 10 foot continuous lengths are available to the artist by the method of the invention.

As a watercoloring surface, the structured art surfaces of the invention exhibit stiffness, easy handling, a high degree of flatness (making them easy to paint or screen print on), crush resistance and dimensional stability. Those skilled in the art will also appreciate their lightweight, per unit of size, facilitating shipment and handling while maintaining maximum rigidity.

The structured art surfaces of my invention are not limited to use as a watercoloring surface. Draftsmen will find the structured art surfaces of the invention advantageous in place of conventional drafting paper.

The term "drafting paper" as used herein means those papers used by the professional artist-draftsman for drawing works of art. Generally they are similar in composition to the watercolor papers described above. Drafting papers may be finished differently from watercolor paper, i.e.; bear a different sizing. In general, drafting papers, particularly the lightest, thinnest papers have the same stability problems associated with watercoloring papers and will buckle when exposed to high humidity or water. With the art surfaces of the invention, these difficulties are obviated.

Conservators will likewise find the structured art surfaces of the invention advantageous in place of conventional conservation papers or mounting boards.

The term "mounting board" is used herein to mean those papers employed by professional conservators as a base for mounting or backing high quality paper works of art and other valuable paper items such as photographs. Conventional mounting board is made by laminating a peper possessing the desired color and surface characteristics to a substrate of paper or pulp board, the latter made to considerable thickness (0.050" or more) to provide stiffness and rigidity in the finished product. The paperboard substrate is often not made to the same standards of purity as that of the surface component of the finished laminate, especially as to chemical neutrality, with the resultant deleterious effect upon the board's own permanence. In extreme cases, either lack of neutrality or chemical impurity of the heavy component of the finished laminate may cause damage to the art work mounted thereon. The art surfaces of the invention are advantageous over conventional mounting board in that they are dimensionally stabilized even over a wide range of humidity fluctuations and buckling problems as described above are obviated. As conservation or museum boards the surfaces of the invention are also advantageous in that, all of the components of the board are chemically neutral and any art work may be mounted on the board surface without fear of damage from the board itself.

As will be appreciated, the structured art surfaces of the invention may also be employed as forms for paper sculpture, collage and like uses.

SUMMARY OF THE INVENTION

The invention comprises a dimensionally stable, crush resistant, non-wrapping, structured art surface, which comprises;
(i) a sandwich laminate support panel having
(a) a sandwich core of neutral paper in the form of a reticulated plate having upper and lower planar surfaces and a plurality of open ended bores perpendicular to and communicating between the upper and lower surfaces, said bores being separated from each other by thin paper walls and having cross-sectional dimensions of from about ¼ inch to about 1 inch; and
(b) facing sheets of neutral paper having first and second planar surfaces adhesively bonded by their first surfaces to upper and lower surfaces of the core with a water-resistant, neutral pH adhesive, so as to close the ends of said bores;
(ii) a sheet of art paper mounted on a second planar surface of the facing sheets; and
(iii) a layer of water-resistant, cured, neutral pH adhesive interposed between the sheet of art paper and said second planar surface of the facing sheets.

The term "water-resistant adhesive" as used herein means the adhesive will not lose its adhesive character when the art paper above it is dampened as would occur for example when the art paper is watercoloring paper and an artist is rendering a watercoloring thereon.

The term "neutral pH" means a pH of 7.0, ±0.5

The term "neutral paper" as used throughout the specification and claims means a paper having a pH range of 6.5 to 8.5. The paper may include inorganic salts to act as a buffering agent to maintain the pH range against imposing acidic conditions.

The term "art paper" as used herein includes watercolor paper, drawing paper and mounting board as previously defined and like art papers.

The structured art surfaces of the invention are useful as surfaces for drawing and watercoloring, oil painting, acrylic painting, as conservation or museum board and as mounting boards for the protection of framed papers and works of art on paper such as watercolors, lithographs, engravings, photographs and the like. The art surfaces of the invention may also be used as matting in the framing of art works and as an art surface for collages, maquettes and the like.

The method of the invention is particularly advantageous for stabilizing watercolor paper.

BRIEF DESCRIPTION OF THE DRAWINGS

FIG. 3 is a cross-sectional view in-part along lines 3—3 of FIG. 2.

FIG. 4 is a cross-sectional in-part view of an embodiment structured art surface of the invention.

DETAILED DESCRIPTION OF THE PREFERRED EMBODIMENTS OF THE INVENTION

Figure 1:
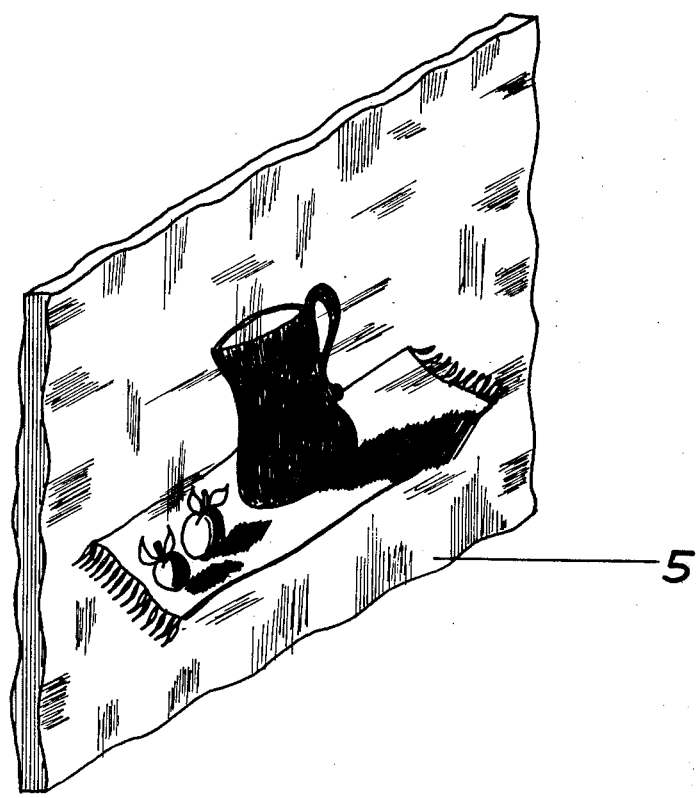
FIG. 1 is a view-in-perspective of a prior art watercolor paper which has been painted with watercolors.
Figure 2:
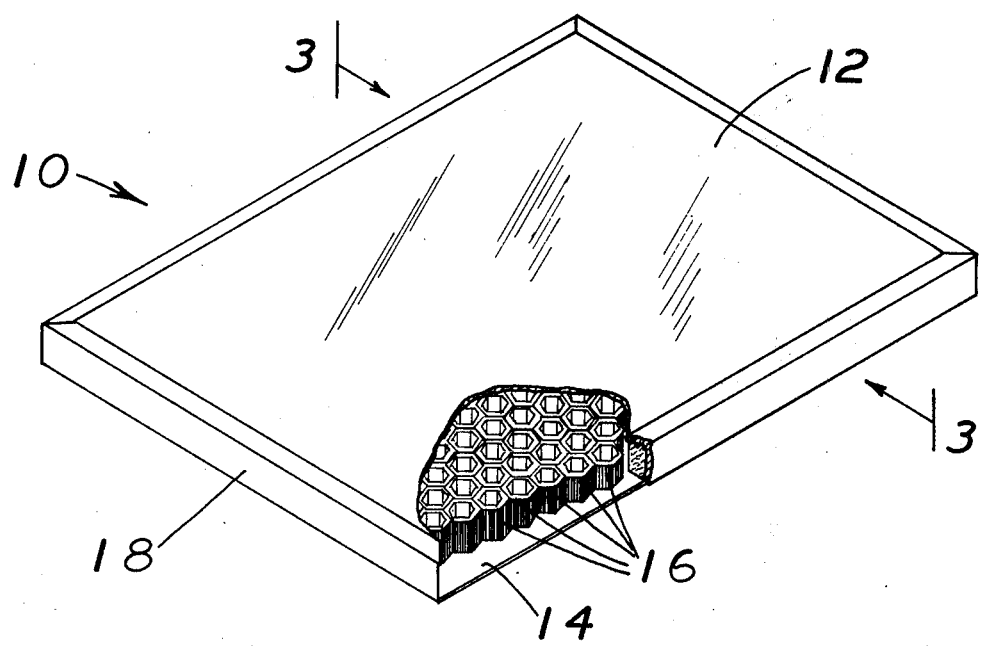
FIG. 2 is a partially cut-away view-in-perspective of a preferred support structure for the art surface of the invention.

FIG. 2 is a view-in-perspective, partially cut away, of a preferred support 10 for the structured art surface of the invention. The support 10 comprises a sandwich type laminate having an upper facing sheet 12 and a lower facing sheet 14 enclosing a honeycomb type of reticulated plate core 16. The core 16 is a reticulated paper plate, i.e.; made up of a plurality of open ended cells which may be of any desired shape, for example hexagonal, circular, oval, rectangular or like shapes. The cell dimensions are critical to the invention and should not be larger, in the widest point along a cross-section, than about 1 inch. In general, the cells should not be smaller than about ¼ inch in cross-section. The cell height is not critical but advantageously may range from ⅛ inch to 2 inches. Increasing the cell height will provide enhanced rigidity and therefore flatter art surfaces in the structured art surfaces of the invention. An increase in the plan dimension of the art surface would normally reduce rigidity. Increasing cell height restores the original rigidity in the larger dimensioned structured art surface. The flatest surface is of course most desirable for printing purposes and such art surfaces of the invention are useful for art techniques whereby a rendition is printed on the art surface. The preferred honeycomb 16 is fabricated from neutral paper, i.e.; the paper ill have a pH within the range of from about 6.5 to about 8.5, preferably 6.5 to 7.5, and most preferably 7.0. Honeycombs of other materials such as non-paper or paper having an acid or highly alkaline pH outside of the above described range are unsuitable since they are likely to contain undesirable materials or substances which may migrate into the sheets 12, 14 as previously described and thereafter into the art surface. Such migration could adversely affect the art surface of the invention. Preferably the honeycomb core 16 is resin-free, i.e.; free of natural resins associated with cellulosic materials. Substantially resin-free paper may be manufactured from 100% rag, highly refined chemical pulps and from a paper pulp of high alpha cellulose content (substantially 100% alpha cellulose). The techniques of fabricating paper honeycomb cores are well known; see for example U.S. Pat. Nos. 2,581,421; 3,074,839 and RE. 26,444. In one method of fabrication, the paper honeycomb structure 16 is produced by superimposing sheets of neutral paper upon each other until a thick stack is formed, each sheet being held to the one above it, by adhesive or other means, along spaced and generally parallel lines, with the lines of one side of each sheet between the lines on the other side of said sheet. The distance between the parallel lines determines the cell size. The thickness of the stack may be varied according to the desired expanded dimension of the honeycomb. The stack is cut at a right angle across the lines holding the sheets together to obtain pieces of a thickness corresponding to the desired thickness of the honeycomb structure. The pieces are then expanded into the desired honeycomb cellular shape. The cell wall thickness depends on the caliper of the paper used. In the honeycomb 16, the cell walls are desirably relatively thin and so text paper weight of from 40 lbs. to 80 lbs. per ream is used. The paper used to construct honeycomb 16 is preferably free of chemical additives which would migrate into the sheets 12, 14 thereby contaminating them. Face sheets 12, 14 are preferably made of resin-free, neutral pH paper such as is provided by 100% rag, high grade alpha cellulose pulps and highly refined cellulose pulps. The fact sheets 12, 14 may be bonded to the upper and lower planar surfaces respectively of core 16 by first applying an adhesive to the upper and lower reticulated surfaces of core 16 and laying sheets 12, 14 thereover to seal and close the open ends of the honeycomb core cells 16. The adhesive may be applied by any conventional method, preferably the means of application will result in a uniform, even distribution of adhesive. Any weight paper may be used as face sheets 12, 14 to form the sandwich laminate support 10. Any conventional means may be employed if desired to close out the edges of the support 10 provided such will not damage the final art surface or detract from the final application of the structured art surface. In FIG. 2, the support 10 is shown closed out with endpiece 18 which preferably is a neutral paper endpiece free of additives or chemicals which by migration to face sheets 12, 14 would contaminate them.

Referring now to FIG. 3, a cross-sectional view in part along lines 3—3 of FIG. 2, further details of the support 10 are seen. The sheets 12, 14 of neutral paper sandwich core 16 are bonded to the sandwich core 16 by adhesive layers 20 and 22, respectively. Advantageously, adhesives 20 and 22 are water-resistant, acid free, mold resistant, neutral pH adhesives. Such adhesives are generally well known as is their use; see for example Clapp, Curatorial Care of Works of Art on Paper, Second Revised Edition, obtainable from the Intermuseum Laboratory, Allen Art Building, Oberline, Ohio 44074. Preferably the adhesive is a uniform, evenly distributed layer.

FIG. 4 is a cross-sectional side elevation of an embodiment structured art surface of the invention. The embodiment of FIG. 4 comprises a support 10 of FIGS. 2 and 3. Mounted on the outer planar surfaces of each of sheets 12, 14 are sheets 24, 26 or art paper. The sheets 24, 26 of art paper are selected so as to have similar dimensional stability (in their unmounted forms) in both planes, and similar response to planar stress, i.e.; elongation, tensile strength etc. If the sheets 24, 26 are greatly dissimilar to each other in this respect, there is potential for warping in the structured art surface. In general, art papers from the same production lots are similar enough for my purpose. Those skilled in the art will appreciate that the degree of similarity permitted may vary slightly but can be determined by trial and error techniques applied to specific art papers. This requirement of similarity does not apply to the face or barrier sheets 12, 14. The support 10 with art papers 24 and 26 mounted thereon make up a structured art surface of the invention. Sheet 26 is adhered to sheet 12 by adhesive layer 30 and sheet 24 is adhered to sheet 14 by adhesive layer 28.

In addition to providing a flat rigid structural art surface, further advantage is found in the finished structure. The manufacturing methods here embodied produce a surface where, as opposed, for example, to the stretched water color papers (as previously described), the fibers of the sheets 24, 26 are not under tension. With these fibers relaxed, there is a greater uniformity of expansion and contraction as caused by changes in temperature and humidity. This reduces the possibility of damage to the art surface which may occur to surfaces supported by other means due to different expansion rates of various layers. There is definitely a greater overall structural and dimensional stability obtained in the laminates of the invention.

Further, the uniform bonding system utilizing uniform amounts of adhesive and pressure provide a very desirable surface. The fibers are not bound or bunched as in some laminating procedures by non-uniform amounts of adhesive and pressures. The resiliency of the honeycomb core during the pressure cycle provides an art surface of noticeable difference and quality as the fibers are not crushed.

Therefore, the invention provides the watercolor painter for example, with an unchanged, enhanced (by virtue of being rigidly supported) fiber structure which shows uniform penetration and spreadability. Puddles of wet colors do not form between rapidly drying areas, and consequently water rings do not appear as blemishes in the final rendition, indicating where puddles existed during execution of the work of art.

The following examples describe the manner and process of making and using the invention and set forth the best mode contemplated by the inventor of carrying out the invention, but is not to be construed as limiting.

EXAMPLE 1

An expanded paper honeycomb is provided having a weight of 0.083 lbs./square ft. The honeycomb measures 4'×8'×¼" and is constructed of 76 lb. Bristol paper manufactured from a high alpha cellulose content wood pulp. The paper has a slightly alkaline pH, i.e.; circa 7.5–8.0. The honeycomb cells are about ¼ inch in cross-sectional dimension and are approximately hexagonal in shape. The cell walls have a thickness of circa 0.0075 inches. One surface of the honeycomb is coated with an epoxy adhesive and covered with a single sheet of neutral pH, 100 lb. paper having a hard surface. The opposite side of the honeycomb core is similarly covered to produce a sandwich laminate. Upon curing of the adhesive, there is obtained a support panel of the invention having dimensional stability, torsional rigidity and resistance to buckling.

The sandwich, which weights about 0.22 lbs./square foot, is then covered on one face with a 2 mil layer of polyethylene adhesive and a single sheet of 72 lb. watercolor paper of excellent quality is bonded thereby to the underlying sandwich, covering the entire 4'×8' surface. Similarly, the other face of the sandwich is covered with another single sheet of watercolor paper to obtain a watercoloring art surface of great stability which may be painted on both sides. The 4'×8' panel weighs about 4 lbs. and may be cut into smaller boards or may be used as is. The ends are closed with a waterproof tape. The watercoloring surface has a very flat, uniform, sink-free surface and may be printed upon. When painted upon with watercolors, the surface remains stable, free of warping or buckling. When exposed to a fluctuating room humidity, i.e.; repeat cycles of 7 days at 50% RH and 7 days to 10% RH, the structure retains its stable surface. The structured art surface is stiff and flex resistant, preventing the kinking or "dog ear" look even when handled roughly.

The structured art surface of this example may be cut with a knife and sculpted to prepare a maquette which can then be finished in water, acrylic, oil or like color.

EXAMPLE 2

Following the procedure of Example 1, supra, but replacing the 72 lb. watercolor paper as used therein with 300 lb. (per 500 sheets of 25"×38" dimension) museum board of fine, acid, free, neutral pH quality, there is obtained a structured art surface useful to archival and art conservators for the mounting, display and preservation of documents, manuscripts, textile materials and fine works of art on paper or other mediums. The art surface is dimensionally stable even under rapidly fluctuating humidity conditions.

EXAMPLE 3

Similarly, following the procedure of Example 1, supra, but replacing the 72 lb. watercolor paper as used therein with 170 lb. (per 500 sheets of 25"×38" paper) drawing Bristol paper, which is a neutral pH paper of fine quality, there is obtained a structured art surface particularly useful for the draftsman to render ink and pencil artistry upon. The structured art surface is dimensionally stable, warp-free and non-buckling even under conditions of fluctuating humidity.

EXAMPLE 4

An expanded paper honeycomb is provided having an approximate weight of from 2.6 to 0.65 lbs./cu. ft. The honeycomb measures from $\frac{1}{8}$" upwards in thickness and is constructed of neutral pH paper manufactured from highly refined chemical pulp. The paper is buffered on the alkaline side to a pH range of 7.5–8.0. The honeycomb cells are from about $\frac{1}{4}$ to 1 inch in cross-sectional dimension and are approximately hexagonal in shape. A sheet of 100 lb. barrier paper is bonded to the top and bottom surfaces of the honeycomb core utilizing a neutral pH water-resistant adhesive as the bonding agent which may or may not be self-crosslinking. After the adhesive cure cycle is complete, the resulting panel has dimensional stability and resistance to bending and buckling. This panel is then the support structure of the invention for the structural art surface.

A sheet of any of several forms of fine art paper is then bonded to the top and bottom surfaces of the support structure utilizing a water-resistant, neutral pH adhesive as the bonding agent which may or may not be self-crosslinking. After the adhesive cure cycle is complete, the resulting panel provides a structured art surface which is flat, rigid, resists bending and buckling, dimensionally stable and warp-free under conditions of fluctuating humidity and temperature. Both sides are available for painting, drawing, mounting or the panel may be used as a support structure as in conservation applications all depending on the finished art paper used. The panel may be 4'×8' or larger as fabricated and may be cut by sawing or with a sharp edged instrument into smaller panels for use. The weight of a 4'×8' panel with a $\frac{1}{2}$" thick honeycomb will range from 6 to 14 lbs. depending on the finished art face used.

EXAMPLE 5

An expanded paper honeycomb is provided measuring 5'×7'×$\frac{3}{4}$" thick constructed of 76 lb. Bristol paper and having a cell size of $\frac{1}{4}$" in cross-sectional dimension. One surface of the honeycomb core is covered with a single sheet of 100 lb., neutral pH paper which has been coated with a self-crosslinking acrylic emulsion adhesive and the adhesive is cured. The opposite face of the honeycomb core is similarly covered to produce a sandwich laminate. One face of the sandwich is coated with the same acrylic emulsion and is then covered with a single, full-sized sheet of 80 lb. (20×26/500) neutral pH art paper and the adhesive is cured. The opposite face of the sandwich is similarly covered to produce a balanced panel which is flat, rigid, dimensionally stable and highly resistant to warpage due to fluctuating humidity conditions. The panel may be used for large screen print panels, as a support structure for mounting of valuable paper antiquities, or may be painted upon with a variety of materials.

After reading the above disclosure, those skilled in the art will appreciate that many variations of the preferred embodiments described above may be effected without departing from the spirit and the scope of the invention. For example, although the described support 10 is flat, one may affix the art paper sheets 24 or 26 to a faced non-planar (in one direction) core 16. Such honeycomb cores are well known as is their fabrication; see for example U.S. Pat. Nos. 2,668,327 and 3,016,315.

In addition, it will be appreciated that the support 10, which is a structure of the invention also, may also be usefully employed to support and mount objects of art such as wallpaper designs, collages and the like.

The relatively thin, low density art surface of the invention are of great advantage in shipping, use and mounting. The structured art surfaces of the invention may be stood on edge for prolonged periods of time without causing them to bow outwardly under their own weights.

Due to their dimensional stability, even while painting or screen printing upon them, the structured art surfaces of the invention are useful even for very demanding dimensional requirements such as in cartographic drafting. The fact that very large art surfaces can be provided by the method of the invention is also an asset for the latter uses of the structured art surfaces of the invention. Plan dimensions of the art surface may be increased substantially without an increase of observable relative dimensional instability.

What is claimed:

1. A dimensionally stable, crush resistant, non-warping, structured art surface, which comprises;
    (i) a sandwich laminate support panel having
        (a) a sandwich core of neutral paper in the form of a honeycomb having upper and lower planar surfaces and a plurality of open ended bores perpendicular to and communicating between the upper and lower surfaces, said bores being separated from each other by thin paper walls and having cross-sectional dimensions of from about ¼ inch to about 1 inch; and
        (b) facing sheets of neutral paper having first and second planar surfaces, adhesively bonded by their first surfaces to upper and lower surfaces of the core with a water-resistant, neutral pH adhesive, so as to close the ends of said bores;
    (ii) sheets of art paper mounted on the second planar surfaces of each facing sheet; and adhesively bonded by
    (iii) a layer of water-resistant, cured, neutral pH, adhesive interposed between the sheets of art paper and said second planar surfaces of the facing sheets; said sheets of art paper on each facing sheet having similar dimensional stability in both planes and similar response to planar stress.

2. A structured art surface of claim 1 wherein said honeycomb is fabricated of a paper made from a paper pulp of substantially 100% alpha cellulose content pulp.

3. A structured art surface of claim 1 wherein said bores have a height of from about ⅛ inch to 2 inches.

4. The structured art surface of claim 1 wherein said art paper is watercoloring paper having a weight of from 70 to 140 lbs. per 500 sheets, based upon a size of 22"×30".

5. A sandwich laminate support panel for stabilizing art paper, which comprises;
    (a) a sandwich core of neutral paper in the form of a honeycomb having upper and lower planar surfaces and a plurality of open ended bores perpendicular to and communicating between the upper and lower surfaces, said bores being separated from each other by thin paper walls and having cross-sectional dimensions of from about ¼ inch to about 1 inch;
    (b) facing sheets of neutral paper having first and second planar surfaces, adhesively bonded by their first surfaces to upper and lower surfaces of the core with a water-resistant, neutral pH adhesive, so as to close the ends of said bores.

* * * * *